United States Patent Office 3,169,417
Patented Feb. 16, 1965

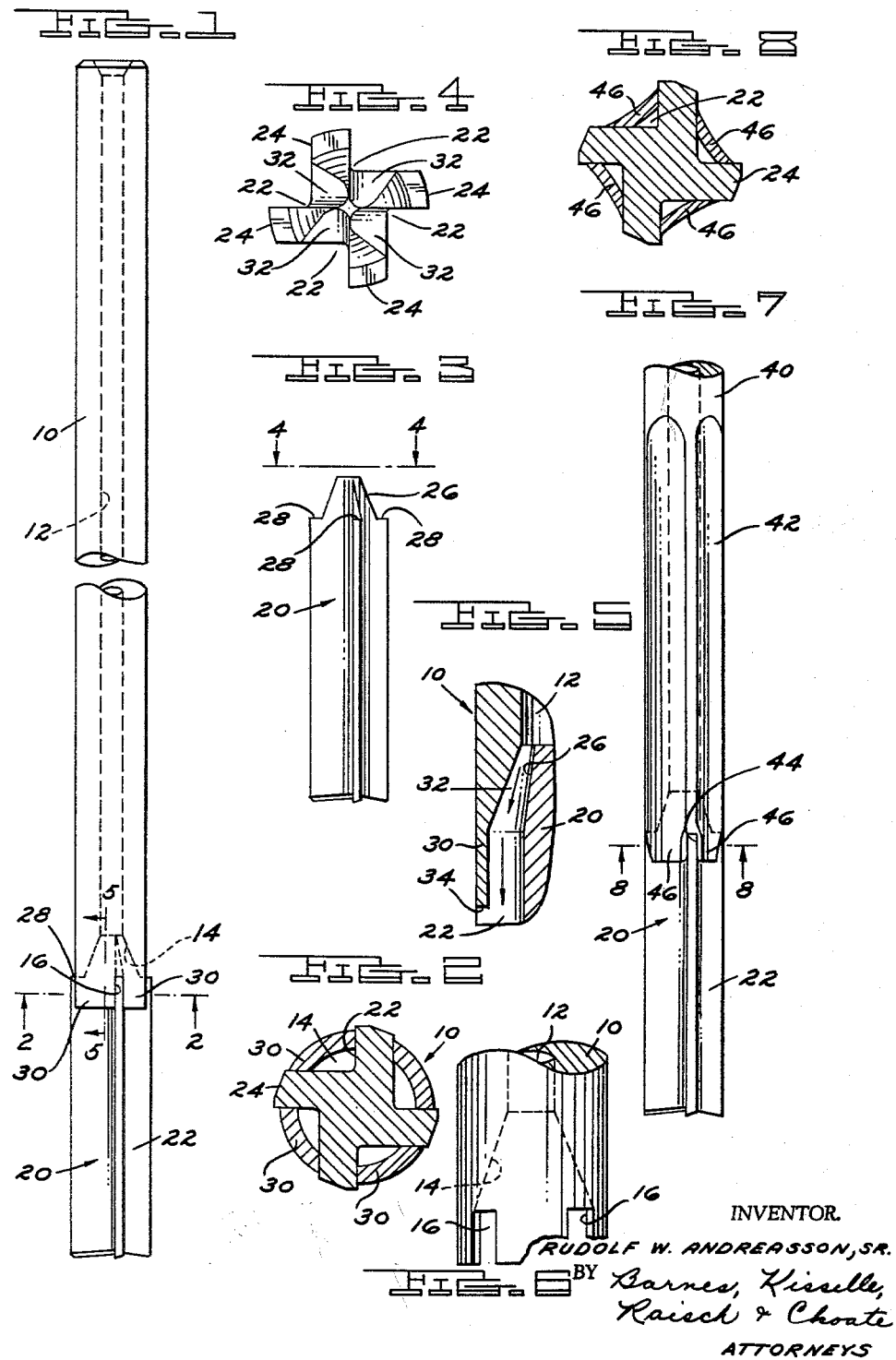

3,169,417
DEEP-HOLE DRILL AND REAMER
Rudolf W. Andreasson, Sr., P.O. Box 174,
Birmingham, Mich.
Filed July 2, 1962, Ser. No. 206,972
5 Claims. (Cl. 77—65)

This invention relates to a deep-hole drill and reamer. This invention is an improvement on that disclosed in my co-pending application, Serial No. 8,066, filed February 11, 1960, now matured into Patent No. 3,055,239, dated September 25, 1962, and reference is also made to my co-pending application, Serial No. 250,076, filed January 8, 1963. In that application, a reamer construction was shown utilizing a hollow tube as a drive shank with a relatively large central bore, the tube being provided at one end with a tapered outlet for receiving the tapered end of a wear tip, the tip being so slotted on its outer surface axially that the slots will communicate with the central passage of the tube, thus providing suitable outlet for the coolant without the necessity of any drilled passages or orifices in the tip. The tip is brazed into the conical recess at the end of the shank.

It is an object of the present invention to provide an improved structure which retains the advantages of the previous structure while adding additional advantages.

One of the advantages and objects of the present structure and invention is a combination of tube and tip which when joined provides a coolant passage which directs coolant straight down the flutes of the tip, thus removing the reliance upon the walls of a hole of a drill bushing to keep the coolant directed toward the actual cutting areas where it is intended to be effective. This construction is accomplished by extending the walls of the tip to a certain degree into the flutes of the tip. This creates another important advantage of the structure, namely, that the walls of the tube become slotted between the projections which overlie the flutes of the tip. These slots engage the lands of the tip so that there is accomplished a positive drive relationship between the two parts, thus in severe conditions, when the brazed joint may become softened by abnormal heat due to a cut off of coolant momentarily, the parts will continue to drive and there can be no destruction or slipping.

Other objects and features of the invention relating to details of construction and operation will be apparent in the following description and claims.

Drawings accompany the disclosure and the various views thereof may be zriefly described as:

FIGURE 1, a side view of the assembled reamer.
FIGURE 2, a sectional view on line 2—2 of FIGURE 1.
FIGURE 3, a side elevation of the tip element.
FIGURE 4, an end view of the tip element taken on line 4—4 of FIGURE 3.
FIGURE 5, a breakaway section taken on line 5—5 of FIGURE 1.
FIGURE 6, an enlarged view of the free end of the shank with the tip removed.
FIGURE 7, a view of a modified structure showing flutes in the side walls of a shank.
FIGURE 8, a sectional view on line 8—8 of FIGURE 7.

Referring to the drawings:

In FIGURE 1, a shank 10 of a reamer comprises a single hollow tube having a central coolant passage 12. The shank is preferably formed of a metal which has enough torque resistance to provide the proper drive. The tip end of the shank is provided with a tapered recess 14, the taper being formed in the side wall of the tube. The side walls of the tube at the bottom end of the taper are extended in skirt portions 30 forming notches 16 for a purpose which will be later described. A reaming tip 20, shown in FIGURE 3, has alternate flutes 22 and lands 24 as in a standard reamer tip, but the end of the tip which is to adjoin the tubular shank is provided with a taper at 26 to match with the taper 14 in the end of the shank. The tapered portion terminates at a shoulder 28 on each land and each flute extends into the taper at 32.

In assembly, as shown in FIGURE 1, the shank end of the lands enters the notches 16 in order that the tapered portion 26 can mate with the tapered portion 14 of the shank. This causes the separate skirt portions 30 at the end of the shank below the taper to extend into the flutes 22 below the shoulders 28. These skirt portions 30 have a close fit with the walls of the flutes as shown in the sectional view of FIGURE 2. The parts as shaped are brazed together in axial alignment. The outer diameter of the shank is preferably slightly less than the outer diameter of the lands of the reamer tip so that there is no scraping or galling action of the shank against the walls of the recess.

In FIGURE 5, the assembled units are shown wherein it will be seen that in assembly the passage 12 connects through extension passages 32 from each flute 22 so that coolant may pass as shown by the arrows from the supply passage 12. The skirt 30 straightens out the flow of the coolant which is coming at an angle through passage 32 so that as it reaches the bottom 34 of the skirt 30, it is traveling straight down in alignment with and closely adjacent the inside of the flutes 22.

In actual practice, when coolant is directed through a reamer of this type with no bushing at all around the tip, the coolant travels straight down and off of the end of the reamer tip, it being possible to see the four separate streams, one from each flute, some distance beyond the tip. In addition, it will be seen that the notches 16 engage the walls of the flutes (see FIGURE 2) so that there is a positive drive between the edges of the skirts and the lands of the reamer tip. In addition, this contact provides additional abrazing surface which rigidifies the joint to a greater extension between the tube and the tip. This connection has the advantage that should the reamer tip be subject to a high increase in heat due to a cut off of the supply of coolant accidentally or some unusual speed or pressure, any softening of the braze will not completely destroy the union between the parts since they are mechanically engaged and as soon as the temperature is brought down, the braze will harden to its regular consistency.

In FIGURE 7, a slightly modified structure is shown having all of the features of that described in FIGURE 1 with the exception that the tube 40 in FIGURE 7 is provided with spaced flutes 42 which merge with the flutes of the tip 20. Here again, the walls of the tube are notched at 44 to provide skirts 46 while lie in the flutes 22 of the tip 20. The parts are brazed together in the same manner as previously described.

The above-described device is particularly advantageous where no drill bushings are used since it is possible to have much greater control over the coolant streaming out of the shank. In some machines, such as turret lathes, for example, no drill bushings are used and in many production machines above 50 percent are without drill bushings. This axial flow resulting from the present construction eliminates a lot of splashing and requires much less protection for the operator as he stands at the machine. In addition, of course, the actual functioning of the tip is improved because the coolant flows directly down to the cutting area where the lubricant and the cooling effect is required at the contacting edges.

It will be apparent, of course, that the tip 20 can be made of solid tungsten carbide or a similar hard material and also from tool steel or high speed steel as desired. The present-day equipment which permits very rapid brazing makes the reamer practically a replaceable part so that should one tip be ground away or destroyed, the same shank can be used with another tip.

I claim:
1. In a rotary tool of the type using a hollow shank tube and a bit bonded to the working end thereof,
   (a) an elongate bit having alternate flutes and lands between a cutting end and a shank end, the shank end having a tapered portion,
   (b) a hollow shank tube having at the bit end, a plurality of separate skirt portions extending axially of the tube and separated by slots, and a recess to receive the tapered end of the bit,
said bit and tube in assembly being bonded together with the tapered portion of the bit in the recess of the tube, and the lands adjacent the tube engaged in the slots of the tube, the skirt portions of said shank overlying in straight axial relation the flutes of said bit to impart a straight axial flow of coolant along said flute to the cutting end.

2. In a rotary tool of the type using a hollow shank and a bit bonded to the working end thereof,
   (a) an elongate bit having alternate straight flutes and lands between a cutting end and a shank end, the shank end having a tapered portion with grooves on the taper merging with each flute, each land terminating at a shoulder below the tapered portion,
   (b) a hollow shank tube having at the bit end, a plurality of separate skirt portions extending axially of the tube and separated by slots, and a recess to receive the tapered end of the bit,
said bit and tube in assembly being bonded together with the tapered portion of the bit in the recess of the tube, and the lands adjacent the tube engaged in the slots of the tube wherein the skirt portions overlie a portion of the straight flutes to impart a straight axial flow of coolant along said flute to the cutting end.

3. In a rotary tool of the type using a hollow shank tube and a bit bonded to the working end thereof,
   (a) an elongate bit having alternate flutes and lands between a cutting end and a shank end, the shank end having a tapered portion, each land terminating at a shoulder below the tapered portion,
   (b) a hollow shank tube having at the bit end, a plurality of separate skirt portions extending axially of the tube and separated by slots, and a recess to receive the tapered end of the bit,
said bit and tube in assembly being bonded together with the tapered portion of the bit in the recess of the tube, and the lands adjacent the tube engaged in the slots of the tube, the shoulder at the end of each land engaging the end of the respective slots in said tube wherein the skirt portions overlie a portion of the straight flutes to impart a straight axial flow of coolant along said flute to the cutting end.

4. In a rotary tool of the type using a hollow shank tube and a bit bonded to the working end thereof,
   (a) an elongate bit having alternate flutes and lands between a cutting end and a shank end, the shank end having a tapered portion with grooves on the taper merging with each flute,
   (b) a hollow shank tube having at the bit end, a plurality of separate skirt portions extending axially of the tube and separated by slots, and a recess to receive the tapered end of the bit,
said bit and tube in assembly being bonded together with the tapered portion of the bit in the recess of the tube, and the lands adjacent the tube engaged in the slots of the tube, each skirt portion overlying a portion of a flute to direct coolant close to the bit and straight down the flute to the cutting end of the bit.

5. In a rotary tool of the type using a hollow shank tube and a bit bonded to the working end thereof,
   (a) an elongate bit having alternate flutes and lands between a cutting end and a shank end, the shank end having a portion shaped to engage with the tube,
   (b) a hollow shank tube having at the bit end a plurality of separate skirt portions extending axially of the tube and separated by slots and a recess to engage and receive the shaped portion of the bit at the shank end thereof,
said bit and tube in assembly being bonded together, the skirt portions of the tube extending over a portion of the flutes of the bit to direct coolant from the interior of the tube in a direction straight down the flutes to the cutting end of the bit.

References Cited in the file of this patent
UNITED STATES PATENTS
3,055,239     Andreasson _____ Sept. 26, 1962

FOREIGN PATENTS
16,727     Great Britain _____ 1910